Frank W. Cline
INVENTOR

United States Patent Office 2,811,397
Patented Oct. 29, 1957

2,811,397

UNIT FOR ADJUSTING TRACKS OF CRAWLER TYPE TRACTORS

Frank W. Cline, Arcadia, Fla.

Application August 18, 1955, Serial No. 529,212

1 Claim. (Cl. 309—1)

This invention relates to plunger construction, and more particularly to the construction of plungers forming a part of units for adjusting tracks of crawler type tractors, the primary object of the invention being to provide a plunger equipped with means for preventing chafing of the plunger surface commonly caused by the plunger vibrating during the operation of the plunger within its cylinder under excessive pressure.

An important object of the invention is to provide a plunger having annular grooves in which rubber rings are mounted, the rubber rings being so constructed that portions thereof extend beyond the wear surface of the plunger, providing a close fit between the plunger and the cylinder wall, cushioning the movements of the plunger.

Still another object of the invention is to provide a bore in the head of the cylinder in which the plunger operates, through which fluid pressure is directed to the cylinder, the bore being tapered inwardly from the outer end thereof so that fluid directed to the interior of the cylinder will be retarded appreciably, resulting in a gradual continuous feed of the fluid to the cylinder to insure against the sudden application of the plunger.

Other and further objects and advantages of the invention will be hereinafter described and the novel features thereof defined in the appended claims.

Referring to the drawing.

Figure 1:
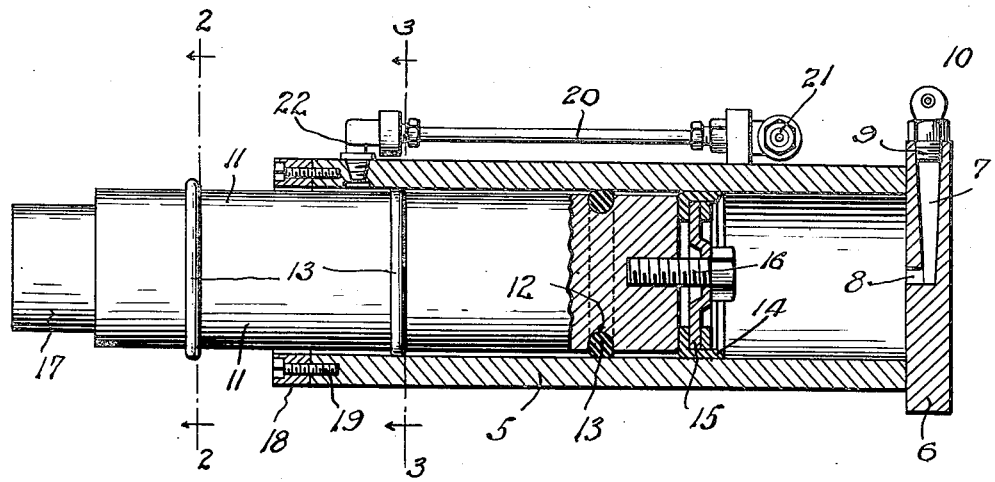
Fig. 1 is a longitudinal sectional view through the cylinder of a unit for adjusting tracks of crawler type tractors, a portion of the plunger being also shown in section.
Figure 2:
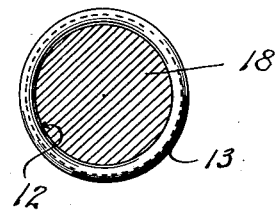
Fig. 2 is a sectional view taken on line 2—2 of Fig. 1.
Figure 3:
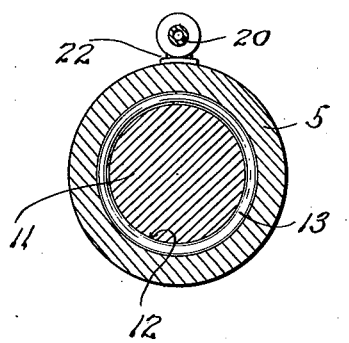
Fig. 3 is a sectional view taken on line 3—3 of Fig. 1.

Referring to the drawing in detail, the reference character 5 indicates a cylinder forming a part of the unit for adjusting tracks of crawler type tractors, the cylinder having a head 6 closing one end thereof. This head 6 is provided with a bore 7 that tapers inwardly towards the opening 8 that establishes communication between the bore 7 and interior of the cylinder 5, as clearly shown by Fig. 1 of the drawing.

A union 9 is fitted in one end of the bore 7, and provides a connection between the pipe 10 and bore 7, through which fluid enters the bore 7 for actuating the plunger of the unit, to be hereinafter more fully described.

The plunger in the unit is indicated by the reference character 11, and is in the form of an elongated piston formed with annular grooves 12, the grooves being semi-circular in formation so that they will receive the cushioning rings 13 that are constructed preferably of rubber, and are of diameters so that major portions of the rings extend beyond the periphery of the plunger 11 to contact the wall of the cylinder 5. These annular grooves in the present showing are three in number although it is to be understood that the number of grooves may be varied to meet the various requirements of use.

The plunger 11 is provided with a cup washer 14 which is held in place by means of the washer disc 15 that bears against the cup washer holding it in place. The washer disc 15 is secured in position by means of the threaded bolt 16 that passes through an opening in the washer disc 15 and is threaded in an opening in one end of the plunger 11. The cup washer will of course provide means for insuring a fluid type connection between the plunger and cylinder wall so that the plunger will receive the entire impact of the fluid used in operating the plunger. One end of the plunger is reduced to provide an extension 17 that bears against the bearing of the gear over which the crawler type tread of the tractor operates.

One end of the cylinder is provided with a ring 18 that is held in place on the cylinder by the bolts 19.

The reference character 20 indicates a pipe that is in communication with a pipe 21 through which lubricating material is fed to the pipe 20, the pipe 20 being in communication with the interior of the cylinder 5, through the union 22 to the end that suitable lubricating material may be directed to the interior of the cylinder to lubricate the movements of the plunger 11 within the cylinder. It will of course be understood that the flow of lubricant through the pipes 20 and 21 will be controlled in the usual and conventional manner.

From the foregoing it will be seen that due to the construction shown and described, I have provided a unit to be mounted on the frame of the conventional tractor of the crawler type, with the end 17 of the plunger resting against the bearing in which the usual shaft of the gearing over which the crawler type tread operates. When it is desired to adjust the bearing to tighten the crawler type tread, it is only necessary to direct fluid pressure through the bore 7 which causes a movement of the extension 17 against the bearing of the crawler type tread, adjusting the bearing.

Should it be desirable to adjust the crawler type tread, fluid pressure within the cylinder against one end of plunger 11 is relieved whereupon the bearing of the crawler type tread may be moved allowing slack to occur in said tread to permit the crawler type tread to be readily repaired.

While the specific details of one embodiment of this invention have been herein shown and described, the invention is not confined thereto as changes and alterations may be made without departing from the spirit and scope thereof as defined in the appended claims.

What is claimed is:

A device of the character described comprising a cylinder having an open end, a head on the other end of said cylinder, a tapered fluid passage extending from a source of fluid supply to the interior of said cylinder, said passage opening into said cylinder at substantially the center of said head, a piston of less diameter than the interior of said cylinder slidably mounted in said cylinder, a plurality of annular grooves of semi-circular cross section spaced along said cylinder, resilient cushioning and sealing rings of circular cross section seating in said grooves for seating said piston resiliently within said cylinder to preclude vibration, said rings also serving as fluid seats, a cup washer on the inner end of said piston, a cup washer disc engaging said cup washer, a screw extending through said disc and said cup washer securing the parts in related assembly, means for inserting lubricant between the wall of said cylinder and said piston, a retaining ring on the open end of said cylinder, bolts holding said ring to said cylinder, and a reduced end on the end of said piston extending out of said cylinder, adapted to engage a bearing for adjustment thereof in accordance with the fluid pressure in said cylinder.

References Cited in the file of this patent

UNITED STATES PATENTS

| | | |
|---|---|---|
| 2,387,181 | Procter | Oct. 16, 1945 |
| 2,388,422 | Krastel | Nov. 6, 1945 |
| 2,392,123 | De La Roza | Jan. 1, 1946 |
| 2,659,194 | Huber | Nov. 17, 1953 |
| 2,673,130 | Becker | Mar. 23, 1954 |
| 2,690,939 | Whaley | Oct. 5, 1954 |
| 2,726,908 | Nied | Dec. 13, 1955 |